(12) United States Patent
Ono

(10) Patent No.: US 9,141,323 B1
(45) Date of Patent: Sep. 22, 2015

(54) PRINTING CONTROL APPARATUS, PRINTING CONTROL SYSTEM AND NON-TRANSITORY COMPUTER READABLE MEDIUM

(71) Applicant: FUJI XEROX CO., LTD., Minato-ku, Tokyo (JP)

(72) Inventor: Mitsuoki Ono, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/460,980

(22) Filed: Aug. 15, 2014

(30) Foreign Application Priority Data

Mar. 20, 2014 (JP) ................................. 2014-059187

(51) Int. Cl.
G06F 3/12 (2006.01)
(52) U.S. Cl.
CPC .............. *G06F 3/1259* (2013.01); *G06F 3/121* (2013.01)
(58) Field of Classification Search
CPC ................................ G06F 3/1259; G06F 3/121
USPC ....................................................... 358/1.14
See application file for complete search history.

(56) References Cited

U.S. PATENT DOCUMENTS

| 6,115,132 A * | 9/2000 | Nakatsuma et al. ......... 358/1.14 |
| 2002/0186384 A1* | 12/2002 | Winston et al. ................ 358/1.5 |
| 2004/0128368 A1* | 7/2004 | Sakai ............................. 709/220 |
| 2007/0236724 A1* | 10/2007 | Rai et al. ...................... 358/1.15 |

FOREIGN PATENT DOCUMENTS

| JP | 2007-4269 A | 1/2007 |
| JP | 2009-75831 A | 4/2009 |

* cited by examiner

*Primary Examiner* — Ngon Nguyen
(74) *Attorney, Agent, or Firm* — Sughrue Mion, PLLC

(57) ABSTRACT

A printing control apparatus including: a receiving unit that receives a print instruction to instruct to print on a recording medium; a transferring unit that makes a storing portion store the print instruction received by the receiving unit and transfers the print instruction to a printing device including a region in which plural print instructions are able to be stored; an acquiring unit that acquires, in the case where a print instruction is deleted in the printing device, if the deleted print instruction is the print instruction transferred by the transferring unit, information related to a processing state of the deleted print instruction in the printing device; and a detecting unit that detects an error of a printing processing in the deleted print instruction based on the information related to the processing state acquired by the acquiring unit.

7 Claims, 10 Drawing Sheets

FIG. 4A

| JOB NAME | JOB ID | DOCUMENT NAME | INSTRUCTED PAGE NUMBER |
|---|---|---|---|
| JOB 1 | 1 | DOCUMENT 1 | 5 |
| JOB 2 | 2 | DOCUMENT 2 | 10 |
| JOB 3 | 3 | DOCUMENT 3 | 15 |

FIG. 4B

| DOCUMENT NAME |
|---|
| DOCUMENT 2 |
| DOCUMENT 3 |

FIG. 4C

| JOB ID | OUTPUT STATUS | OUTPUT PAGE NUMBER |
|---|---|---|
| 2 | OUTPUT UNCOMPLETED | — |
| 3 | OUTPUT COMPLETED | 15 |

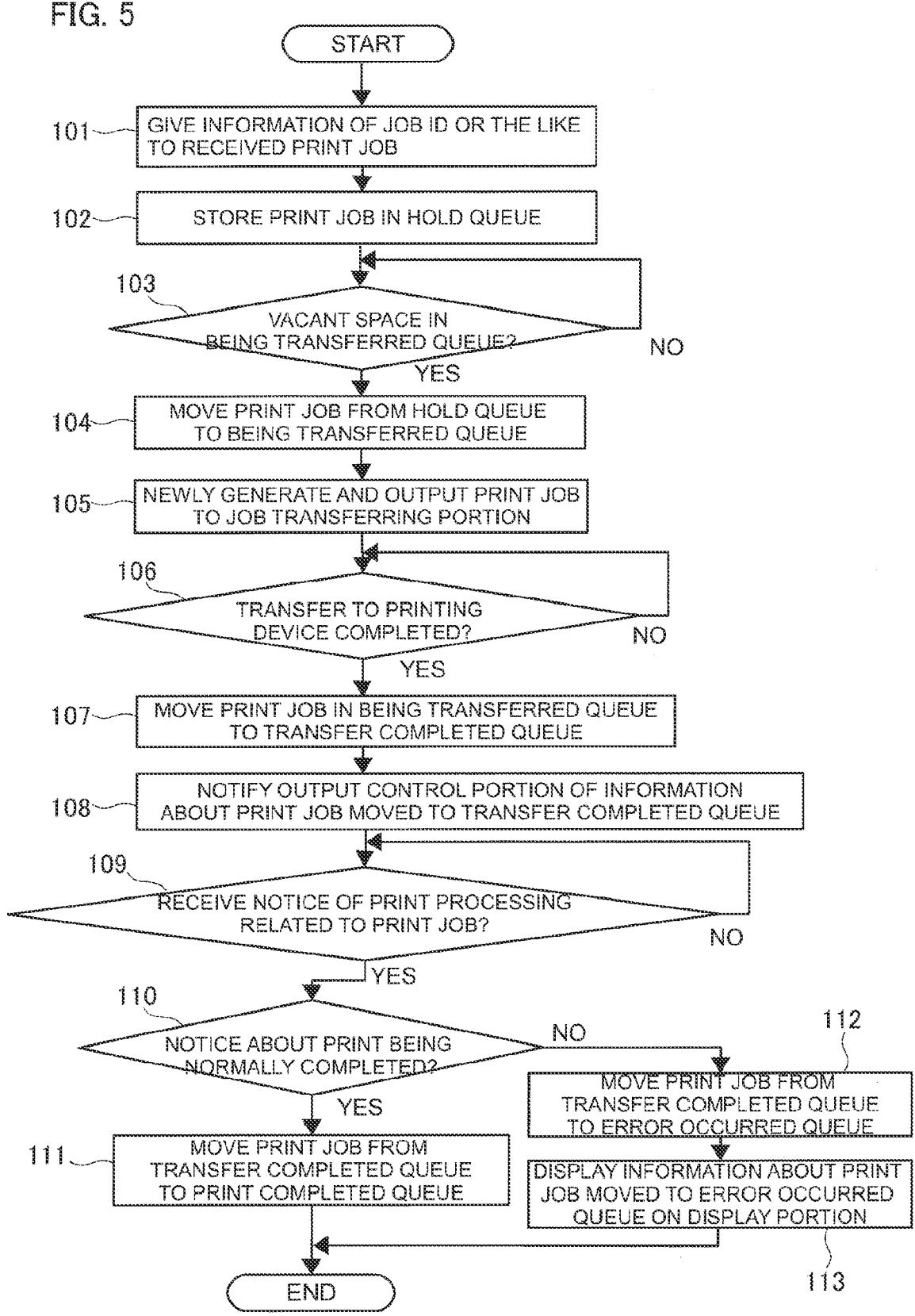

FIG. 9A

| JOB NAME | JOB ID | DOCUMENT NAME | INSTRUCTED PAGE NUMBER |
|---|---|---|---|
| JOB 1 | 1 | DOCUMENT 1 | 5 |
| JOB 2 | — | — | 100 |
| JOB 2 | 2 | DOCUMENT 2-1 | 50 |
| JOB 2 | 3 | DOCUMENT 2-2 | 50 |
| JOB 3 | 4 | DOCUMENT 3 | 15 |

FIG. 9B

| DOCUMENT NAME |
|---|
| DOCUMENT 2-1 |

FIG. 9C

| JOB ID | OUTPUT STATUS | OUTPUT PAGE NUMER |
|---|---|---|
| 2 | OUTPUT UNCOMPLETED | — |

PRINTING CONTROL APPARATUS, PRINTING CONTROL SYSTEM AND NON-TRANSITORY COMPUTER READABLE MEDIUM

CROSS REFERENCE TO RELATED APPLICATIONS

This application is based on and claims priority under 35 USC §119 from Japanese Patent Application No. 2014-059187 filed Mar. 20, 2014.

BACKGROUND

1. Technical Field

The present invention relates to a printing control apparatus, a printing control system and a non-transitory computer readable medium.

2. Related Art

There exists a printing control apparatus which monitors a processing state of a print job in a printing device based on information acquired from the printing device.

SUMMARY

According to an aspect of the present invention, there is provided a printing control apparatus including: a receiving unit that receives a print instruction to instruct to print on a recording medium; a transferring unit that makes a storing portion store the print instruction received by the receiving unit and transfers the print instruction to a printing device including a region in which plural print instructions are able to be stored; an acquiring unit that acquires, in the case where a print instruction is deleted in the printing device, if the deleted print instruction is the print instruction transferred by the transferring unit, information related to a processing state of the deleted print instruction in the printing device; and a detecting unit that detects an error of a printing processing in the deleted print instruction based on the information related to the processing state acquired by the acquiring unit.

BRIEF DESCRIPTION OF THE DRAWINGS

An exemplary embodiment of the present invention will be described in detail based on the following figures, wherein:

FIG. 4A is a diagram showing a specific example of a transfer completed list;

FIG. 4B is a diagram showing a specific example of a delete list;

FIG. 4C is a diagram showing a specific example of an output completed list;

FIG. 5 is a flowchart showing a specific example of a processing procedure in which one print job is sequentially stored in each queue;

FIGS. 9A to 9C are diagrams showing specific examples of each list when a division job has become an output error.

DETAILED DESCRIPTION

Hereinafter, an exemplary embodiment of the present invention will be described in detail with reference to the attached drawings.

First Exemplary Embodiment

Overall Configuration of System

Figure 1:
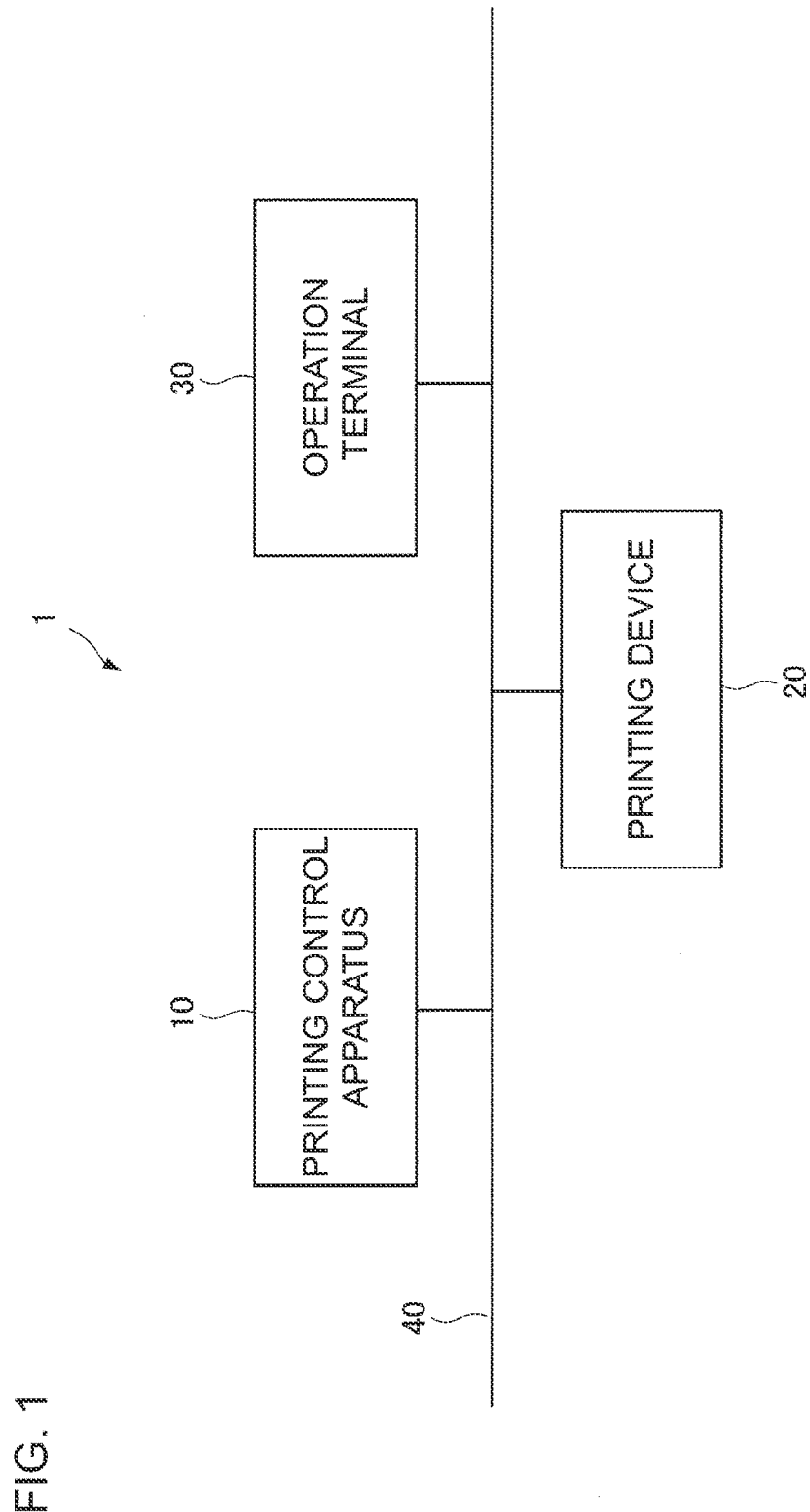
FIG. 1 is a diagram showing a specific example of a schematic configuration of the printing control system in the present exemplary embodiment.

First of all, an overall configuration of a printing control system 1 will be explained. FIG. 1 is a diagram showing a specific example of a schematic configuration of a printing control system 1 in the present exemplary embodiment. The printing control system 1 in the present exemplary embodiment includes a printing control apparatus 10, a printing device 20 and an operation terminal 30, which are connected to a network 40.

The printing control apparatus 10 sequentially transfers a print job transmitted from the operation terminal 30 to the printing device 20 (the details will be described later), and acquires a processing state of the transferred print job from the printing device 20. Then, the printing control apparatus 10 detects an error of the print processing based on the processing state in the printing device 20, and separately manages a print job in which print have been normally completed in the printing device 20 and a print job in which print have not been normally completed in the printing device 20. Here, a print job includes image data to be printed and a control command which describes settings in a print processing, and represents a unit of data for the print processing performed in the printing device 20. In the present exemplary embodiment, a print job is used as an example of a print instruction.

The printing device 20 is, for example, a device which has a scan function, a print function, a copy function, a facsimile function and the like, and performs a print processing by forming an image on a recording medium such as a sheet based on a print job transferred from the printing control apparatus 10. Here, the printing device 20 is assumed to have a spool function temporarily storing a transferred print job in a second spooler 21 (refer to FIG. 2) in the printing device 20 and to perform a print processing outputting the print job from the second spooler 21 in response to an operation by a user. The second spooler 21 is regarded as a region in which plural print jobs are able to be stored.

The printing device 20 notifies the printing control apparatus 10 of information about a print job held by the printing device 20, processing state of each print job or the like in response to a request from the printing control apparatus 10. Here, for example, a print job that the printing device 20 holds is notified to the printing control apparatus 10 with Line Printer daemon protocol (LPR) that is a protocol for performing print. Furthermore, the processing state of each print job is notified to the printing control apparatus 10, for example, as MIB information. MIB information is generally information disclosed by an apparatus, which is an object to be monitored with Simple Network Management Protocol (SNMP) that is a protocol for monitoring an apparatus, in order to notify outside portions of the state of the own apparatus. In the present exemplary embodiment, MIB information is used as an example of information related to a processing state.

The operation terminal 30 is a terminal which is operated by a user when data such as an image and a document is printed. For example, the operation terminal 30 is a Personal Computer (PC). The operation terminal 30 generates a print job in response to operations by a user, and transmits the generated print job to the printing control apparatus 10.

The network 40 as an example of a communication line is a communication unit which is used for information communication among the printing control apparatus 10, the printing device 20 and the operation terminal 30. For example, the network 40 is a Local Area Network (LAN). In the present exemplary embodiment, the printing control apparatus 10, the printing device 20, and the operation terminal 30 are configured to be connected with the network 40; however, it is not limited thereto. For example, a network connecting the printing control apparatus 10 with the printing device 20 and a network connecting the printing control apparatus 10 with the operation terminal 30 may separately exist.

As described above, the printing control system 1 transmits a print job to the printing device 20 not directly from the operation terminal 30 but through the printing control apparatus 10 in order to execute a print.

<Functional Configuration of Printing Control Apparatus>

Figure 2:
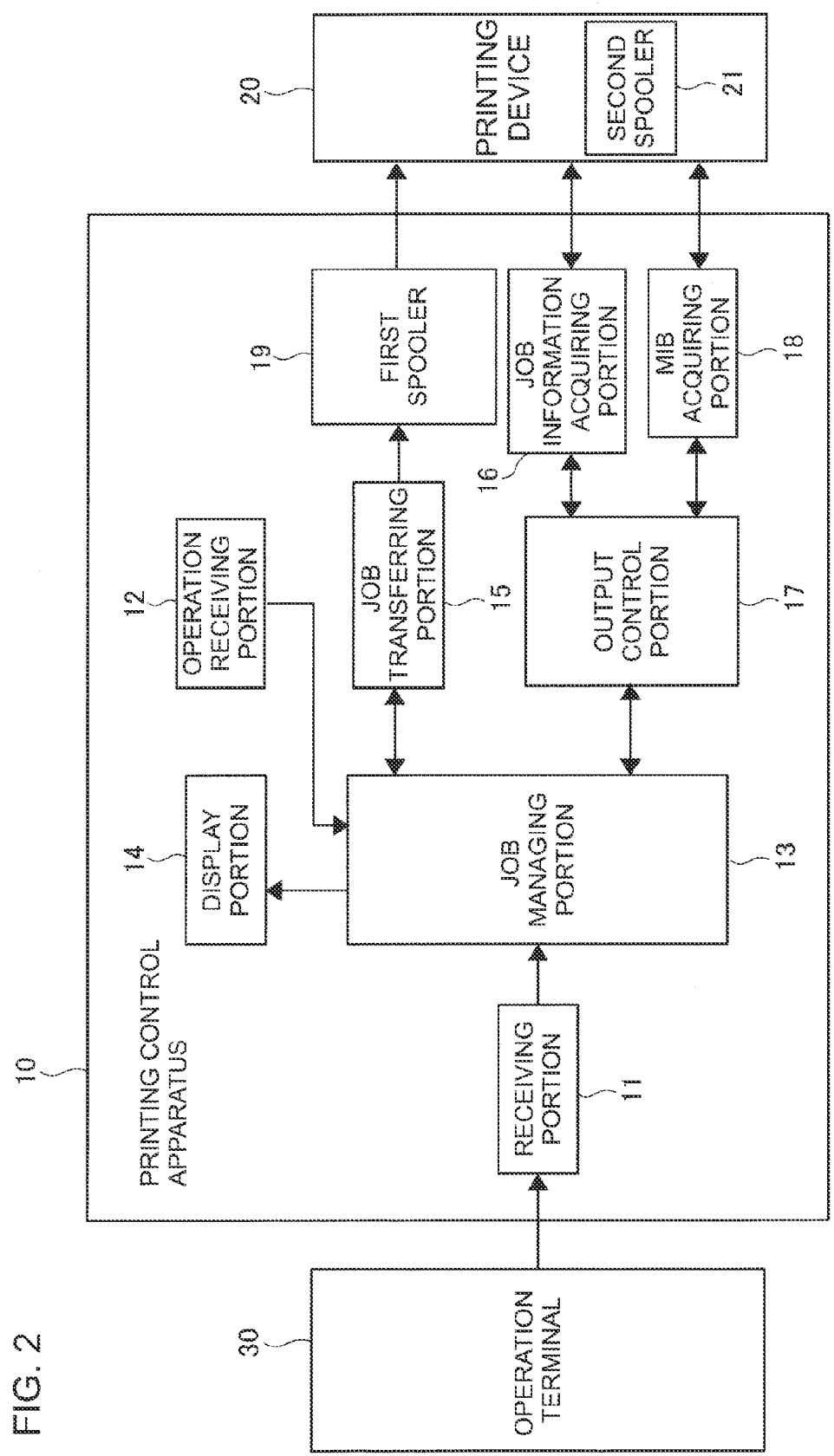
FIG. 2 is a block diagram showing a specific example of a functional configuration of a printing control apparatus in the present exemplary embodiment.

Next, a functional configuration of the printing control apparatus 10 will be explained. FIG. 2 is a block diagram showing a specific example of the functional configuration of the printing control apparatus 10 in the present exemplary embodiment.

The printing control apparatus 10 includes a receiving portion 11 which receives a print job, an operation receiving portion 12 which receives an operation by a user, a job managing portion 13 which manages a print job by storing a print job in a queue, a display portion 14 which displays information or the like related to a print job, and a job transferring portion 15 which transfers a print job to a first spooler 19 described later. The printing control apparatus 10 includes a job information acquiring portion 16 which acquires information about a print job stored in the second spooler 21 of the printing device 20, an output control portion 17 which detects an error of a print processing in a print job, a MIB acquiring portion 18 which acquires MIB information related to a print job from the printing device 20, and the first spooler 19 which temporarily stores a print job and transfers the print job to the printing device 20.

The receiving portion 11 as an example of a receiving unit receives a print job transmitted from the operation terminal 30.

The operation receiving portion 12 receives an operation by a user such as an operation of transferring a print job to the printing device 20.

The job managing portion 13 as an example of a transferring unit and a movement control unit includes a recording portion, acquires a print job received by the receiving portion 11 and stores the acquired print job in a queue. A queue is a region having a data structure with a feature in which a data inputted first is outputted first. Here, the job managing portion 13 includes, as queues for storing print jobs, five queues of: a hold queue; a being transferred queue; a transfer completed queue as an example of a first region; a print completed queue as an example of a second region; and an error occurred queue as an example of a third region. The job managing portion 13 manages a print job in the queues separately from the print job transferred to the printing device 20 for a print processing, and controls so that a print job is moved to the hold queue, the being transferred queue, the transfer completed queue, and the print completed queue (or the error occurred queue) in this order.

The hold queue is a region in which a print job received by the receiving portion 11 is firstly stored. The being transferred queue is a region in which a print job being transferring from the first spooler 19 to the printing device 20 is stored. The transfer completed queue is a region in which a print job being completely transferred from the first spooler 19 to the printing device 20 is stored. The print completed queue is a region in which a print job whose print processing in the printing device 20 is normally completed is stored. The error occurred queue is a region in which a print job having come to be an output error due to not normally completing a print processing in the printing device 20 is stored. A print job stored in the error occurred queue is, for example, used when a print processing is executed again.

When the job managing portion 13 stores a print job in the hold queue, the job managing portion 13 applies information such as a job ID used for identifying a print job to each print job. A job ID is, for example, a number representing an order in which a print job is received by the receiving portion 11. If the operation receiving portion 12 receives an operation of selecting a print job in the hold queue, the job managing portion 13 moves the selected print job from the hold queue to the being transferred queue. However, the number of print jobs being able to be stored in the being transferred queue is predetermined, and in the case where the being transferred queue has no vacant space, the print job stored in the hold queue is to wait until vacant space is available in the being transferred queue.

When the job managing portion 13 moves a print job to the being transferred queue, the job managing portion 13 generates the same print job as the print job to be moved and outputs the generated print job to the job transferring portion 15. Here, the print job outputted to the job transferring portion 15 is applied information such as the same job ID as the print job moved to the being transferred queue. Then the print job outputted to the job transferring portion 15 is transferred from the job transferring portion 15 to the first spooler 19 and to the printing device 20.

The job managing portion 13, for example, periodically acquires a transferring state of a print job from the first spooler 19. Then, when the job managing portion 13 determines that transfer of the print job from the first spooler 19 to the printing device 20 has been completed, the job managing portion 13 moves, from the being transferred queue to the transfer completed queue, the print job which has the same job ID as the print job whose transfer is completed.

The job managing portion 13 notifies the output control portion 17 of the information about the print job moved to the transfer completed queue. Here, since vacant space is available in the being transferred queue as the job managing portion 13 moves a print job to the transfer completed queue, the job managing portion 13 executes a processing of sequentially moving a print job in the hold queue to the being transferred queue if a print job in the hold queue is selected by a user.

When the job managing portion 13 receives, from the output control portion 17, notice of a print job in which print by the printing device 20 has been normally completed, the job managing portion 13 moves, from the being transferred queue to the print completed queue, a print job which has the same job ID as the print job in which print has been normally completed. On the other hand, when the job managing portion 13 receives, from the output control portion 17, notice of a print job in which print by the printing device 20 is abnormally finished, the job managing portion 13 moves, from the transfer completed queue to the error occurred queue, a print job which has the same job ID as the print job in which print is abnormally finished. Then, the job managing portion 13 executes a control of displaying the information about the print job moved to the error occurred queue on the display portion 14.

The display portion 14 displays and informs a user of information or the like about a print job moved to the error occurred queue based on control by the job managing portion 13.

The job transferring portion 15, as an example of a transferring unit, acquires a print job stored in the hold queue of the job managing portion 13 and transfers the acquired print job to the printing device 20 through the first spooler 19. Here, the job transferring portion 15 is assumed to output the image data included in the acquired print job to the first spooler 19 by converting the image data into a format (for instance, a format of Enhanced Meta File and the like) with which data can be outputted in the printing device 20.

The job information acquiring portion 16, as an example of an information acquiring unit, for example, periodically acquires information about a print job stored in the second spooler 21 of the printing device 20 (hereinafter, referred to as a spooled job information) from the printing device 20. The job information acquiring portion 16 compares the acquired spooled job information with the spooled job information previously acquired, and notifies the output control portion 17 of the information about a print job which is deleted, that is, about a print job which exists not in the present spooled job information but in the previous spooled job information. Here, assuming that a list of information about print jobs which are deleted is referred to as a delete list, the job information acquiring portion 16 collectively notifies the output control portion 17 of information about all the print jobs which are deleted as the delete list. In the present exemplary embodiment, the spooled job information is used as an example of information representing a print instruction held by the printing device 20, a first information and a second information.

As an example of a detecting unit and an identifying unit, the output control portion 17 holds a list indicating information about print jobs in the transfer completed queue (hereinafter, referred to as a transfer completed list). When the output control portion 17 is notified of information about a print job moved to the transfer completed queue from the job managing portion 13, the control portion 17 updates the transfer completed list based on the notified information. When the output control portion 17 is notified of a delete list from the job information acquiring portion 16, the output control portion 17 compares the transfer completed list with the delete list and determines whether print jobs of the delete list are recorded in the transfer completed list as well or not.

Here, there is a case where a print job is transferred to the printing device 20 from another apparatus which is different from the printing control apparatus 10. Therefore, a print job recorded in both of the transfer completed list and the delete list would be identified as a print job transferred from the printing control apparatus 10 out of the print jobs which are deleted in the printing device 20. Hereinafter, out of print jobs in the delete list, a print job recoded in the transfer completed list as well is referred to as "a delete job".

When the output control portion 17 identifies a delete job, the output control portion 17 notifies the MIB acquiring portion 18 of information about the identified delete job, and acquires MIB information of the delete job through the MIB acquiring portion 18. The output control portion 17 detects an error of a print processing of the delete job on the basis of the acquired MIB information, and determines whether the print processing in the printing device 20 is normally completed or not. Then, the output control portion 17 notifies the job managing portion 13 of the determined result.

As an example of an acquiring unit, the MIB acquiring portion 18 acquires MIB information of the delete job from the printing device 20 based on information about the delete job which is notified by the output control portion 17, and notifies the output control portion 17 of the acquired MIB information. Here, the acquired MIB information includes information about whether print of a delete job is completed or not, the number of pages outputted in print and the like. The MIB acquiring portion 18 notifies the output control portion 17 of the acquired MIB information as a below-described output completed list.

The first spooler 19 temporarily stores (spools) a print job outputted from the job transferring portion 15, and sequentially transfers the print job to the second spooler 21 in the printing device 20. The first spooler 19 is configured with a printer driver utilized for using the printing device 20 and the like. As the first spooler 19, for example, Windows (a registered trademark in Japan) spooler and the like are generally used. For example, in the case where Windows spooler is used, a user can use a various kind of devices supporting Windows spooler as the printing device 20.

<Explanation of Each Queue of Job Management Portion 13>

Figure 3:
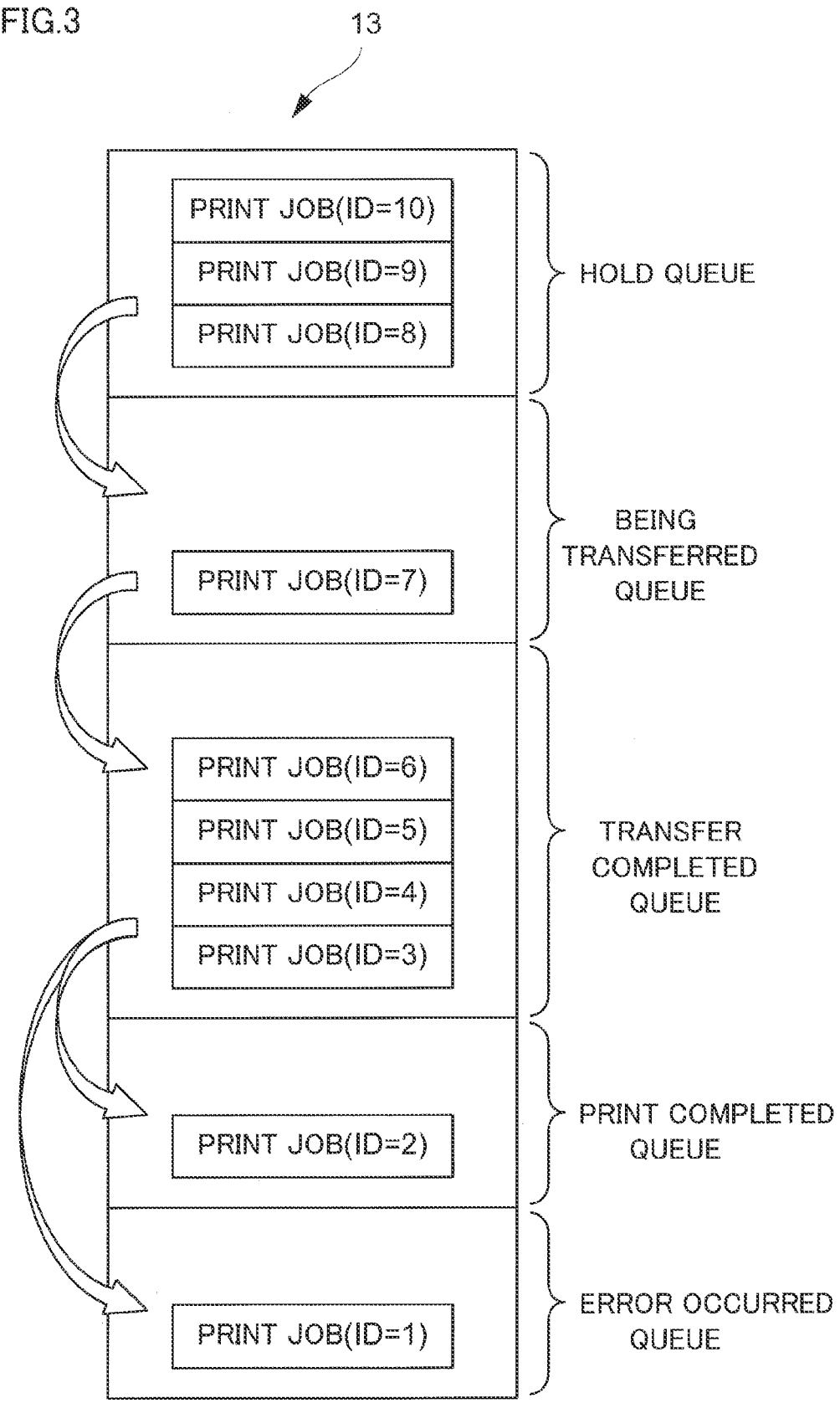
FIG. 3 is a diagram showing specific examples of queues which a job managing portion has.

Next, queues which the job managing portion 13 has will be explained. FIG. 3 is a diagram showing specific examples of the queues which the job managing portion 13 has. The job managing portion 13 has the hold queue, the being transferred queue, the transfer completed queue, the print completed queue and the error occurred queue as described above.

Firstly, a print job received by the receiving portion 11 is stored in the hold queue given information such as a job ID. The hold queue shown in FIG. 3 stores therein three print jobs in which job IDs thereof respectively indicate 8 to 10. The print jobs stored in the hold queue are sequentially moved to the being transferred queue, and the same print jobs newly generated are transferred to the printing device 20. A print job in which the job ID thereof indicates 7 is stored in the being transferred queue shown in FIG. 3, and another print job in which the job ID thereof indicates 7 is transferred to the printing device 20 by the first spooler 19 though not shown in the figure.

When transfer to the printing device 20 is completed, the print job having the same job ID as the print job in which transfer is completed is moved from the being transferred queue to the transfer completed queue. A transfer completed queue shown in FIG. 3 stores therein four print jobs in which job IDs thereof respectively indicate 3 to 6. Though not shown in the figure, the printing device 20 holds other print jobs in which job IDs thereof respectively indicate 3 to 6, and sequentially executes a print processing in response to an operation by a user. The information about the four print jobs is recorded in the transfer completed list.

When print in the printing device 20 is normally completed, the print job having the same job ID as the print job in which print has been normally completed is moved from the transfer completed queue to the print completed queue. On the other hand, in the case where print is abnormally finished, the print job having the same job ID as the print job in which print is abnormally finished is moved from the transfer completed queue to the error occurred queue. The print completed queue shown in FIG. 3 stores therein the print job in which the job ID thereof indicates 2, and print of the print job (the job ID=2) is regarded as being normally completed. On the other hand, the error occurred queue shown in FIG. 3 stores therein the print job in which the job ID thereof indicates 1, and the print of the print job (the job ID=1) is regarded as being abnormally finished.

<Explanation of Each List>

Next, the transfer completed list, the delete list and the output completed list will be explained. FIG. 4A is a diagram showing a specific example of the transfer completed list. FIG. 4B is a diagram showing a specific example of the delete list. FIG. 4C is a diagram showing a specific example of the output completed list. It will be explained in the specific examples in FIG. 4A to FIG. 4C on the assumption that three print jobs (job IDs=1 to 3) are spooled in the printing device 20, the print job (the job ID=2) out of the three print jobs is deleted by the printing device 20 before the print processing, and the print job (the job ID=3) is normally printed.

Firstly, in the transfer completed list shown in FIG. 4A, information about the three print jobs (the job IDs=1 to 3) are recorded. That is, the printing device 20 holds the three print jobs (the job ID=1 to 3), and other print jobs in which the job IDs thereof respectively indicate 1 to 3 are stored in the transfer completed queue. Here, "a job name" represents a name given to a print job. "A job ID" represents a job ID given to a print job. "A document name" represents a unique name given to a print job so that a print job outputted by another apparatus which is different from the printing control apparatus 10 is identifiable. "An instructed page number" represents a number of pages instructed to be outputted by a print job (hereinafter, referred to as "an instructed page number").

Additionally, the job name is, for example, a name given in accordance with a predetermined rule in the printing control apparatus 10. The job ID is, as above-described, for example, a number representing the order in which the receiving portion 11 receives a print job. These job name and job ID are applied in order to identify the print job in the printing control apparatus 10. Therefore, there is a case where a job name and a job ID are reused as long as the job name and the job ID are not overlapped in the same period in the printing control apparatus 10, and a case where what the printing control apparatus 10 gives and what another apparatus gives are overlapped.

Then, a print job is given a unique document name other than the job name and the job ID so that the print job comes to be able to be identified in the printing control apparatus 10 and to be identified from the print job transferred from another apparatus to the printing device 20. The document name is, for example, an individual name of the printing control apparatus 10 and a combination of the individual name and information about date and time. In the present exemplary embodiment, the document name is used as an example of unique information.

Next, information about two print jobs is recorded in the delete list shown in FIG. 4B. The delete list shown in FIG. 4B indicates that the two print jobs in which the document names thereof are respectively "document 2" and "document 3" are deleted in the printing device 20.

When the output control portion 17 identifies a deleted job, for example, the output control portion 17 compares the document name of the delete list shown in FIG. 4B with the document name of the transfer completed list shown in FIG. 4A, and determines whether print jobs of the delete list are also recorded in the transfer completed list or not. In the specific examples shown in FIGS. 4A to 4C, the two print jobs (the job IDs=2, 3) are identified as a deleted job recorded in the transfer completed list and the delete list.

Next, in the output completed list shown in FIG. 4C, information about the two print jobs is recorded. The output completed list shown in FIG. 4C indicates information about two deleted jobs (the job ID=2, 3) which are identified by the output control portion 17 based on the transfer completed list shown in FIG. 4A and the delete list shown in FIG. 4B. Additionally, the output completed list shown in FIG. 4C is MIB information acquired from the printing device 20 based on the job IDs (=2, 3) of the deleted job notified by the output control portion 17 to the MIB acquiring portion 18.

Here, "the job ID" indicates a job ID given to a print job. "An output status" indicates an output status of a print job in the printing device 20. "An output page number" indicates a number of pages completely outputted which are actually outputted in the printing device 20 based on the print job (hereinafter, referred to as "an outputted page number").

Then, the output control portion 17 detects an error of a print processing of the deleted job based on the output completed list, and determines whether print of the deleted job has been normally completed or not. Here, the output control portion 17 confirms "the output status" of the output completed list, and detects that an error is occurred on a print job whose status is "output uncompleted". Then, the output control portion 17 determines that the print job is a print job deleted in the printing device 20 without being printed and has become an output error.

The output control portion 17 confirms "output status" of the output completed list and further determines, in the case where the status of a print job is "output completed", whether an outputted page number thereof accords with an instructed page number thereof or not. Then, in the case where the outputted page number thereof accords with the instructed page number thereof, the output control portion 17 determines that print of the print job has been normally completed. On the other hand, in the case where the outputted page number thereof is different from the instructed page number thereof, the output control portion 17 detects that an error of the print job occurs, and determines that the print job is not normally printed and has become an output error.

In the specific example shown in FIG. 4C, since "the output status" of the print job (the job ID=2) is "output uncompleted", the output control portion 17 determines that the print job is not normally printed and has become an output error. For "the output status" of the print job (the job ID=3) is "output completed", the output control portion 17 compares the instructed page number with the outputted page number. That is, the output control portion 17 compares the instructed page number of the print job (the job ID=3) in the transfer completed list shown in FIG. 4A with the outputted page number of the print job (the job ID=3) in the output completed list shown in FIG. 4C. In the specific examples shown in FIGS. 4A to 4C, as the instructed page number accords with the outputted page number which is 15 pages, the output control portion 17 determines that print of the print job (the job ID=3) has been normally completed.

<Processing Procedure of Storing Printing Job into Each Queue>

Next, a processing in which the job managing portion 13 stores a print job into each queue will be explained. FIG. 5 is a flowchart showing a specific example of a processing procedure in which one print job is sequentially stored into each queue.

First of all, when the receiving portion 11 receives a print job transmitted from the operation terminal 30, the job managing portion 13 gives information such as a job ID and a document name to the received print job (step 101). In the specific example shown in FIG. 5, it will be explained on the assumption that, for example, the job managing portion 13 gives the job ID "1" to the print job. Then, the job managing portion 13 stores the print job (the job ID=1) in the hold queue (step 102).

Next, when the print job (the job ID=1) is selected by a user, the job managing portion 13 determines whether the being transferred queue has vacant space or not (step 103). If the being transferred queue has vacant space (Yes in step 103), the job managing portion 13 moves the print job (the job ID=1) from the hold queue to the being transferred queue (step 104). On the other hand, if the being transferred queue has no vacant space (No in step 103), the job managing portion 13 waits until the being transferred queue comes to have vacant space. In the case where the hold queue stores a print job which is stored earlier than the print job (the job ID=1), the print job stored earlier is moved to the being transferred queue in the order. After the job managing portion 13 moves the print job (the job ID=1) to the being transferred queue, the job managing portion 13 newly generates and outputs a print job (the job ID=1) to the job transferring portion 15 (step 105). Then, the print job (the job ID=1) is transferred from the job transferring portion 15 to the first spooler 19 and further to the printing device 20.

Next, the job managing portion 13 determines whether transfer of the print job (the job ID=1) to the printing device 20 has been completed or not (step 106). Here, the job managing portion 13, for example, periodically acquires the transfer status of the print job (the job ID=1) from the first spooler 19, and in the case where the transfer from the first spooler 19 to the printing device 20 has not been completed (No in step 106), the job managing portion 13 waits until the transfer is completed. On the other hand, transfer of the print job (the job ID=1) from the first spooler 19 to the printing device 20 has been completed (Yes in step 106), the job managing portion 13 moves the print job (the job ID=1) stored in the being transferred queue to the transfer completed queue (step 107). Moreover, the job managing portion 13 notifies the output control portion 17 of the information about the print job (the job ID=1) which the job managing portion 13 moved to the transfer completed queue (step 108).

Next, the job managing portion 13 determines whether the job managing portion 13 receives notice of the print processing related to the print job by the output control portion 17 (step 109). Here, if the job managing portion 13 does not receive notice of the print processing (No in step 109), the job managing portion 13 waits until the job managing portion 13 receives the notice. If the job managing portion 13 receives the notice of the print processing related to the print job from the output control portion 17 (Yes in step 109), the job managing portion 13 determines whether the notice is about the print being normally completed by the printing device 20 or not (step 110). If the notice is about print being normally completed (Yes in step 110), the job managing portion 13 moves, from the being transferred queue to the print completed queue, a print job having the same job ID as the print job in which the print has been normally completed (step 111), and the present processing flow finishes. That is, the job managing portion 13 moves the print job (the job ID=1) in the being transferred queue to the print completed queue when the notice of the print processing is about the print of the print job (the job ID=1) being normally completed.

On the other hand, if the notice is not about the print being normally completed (No in step 110), the notice is about the print by the printing device 20 being abnormally finished. Then the job managing portion 13 moves a print job having the same job ID as the print job in which print is abnormally finished from the being transferred queue to the error occurred queue (step 112). Then the job managing portion 13 displays information about the print job which the job managing portion 13 moves to the error occurred queue on the display portion 14 (step 113), and the present processing flow finishes. That is, the job managing portion 13 moves the print job (the job ID=1) in the being transferred queue to the error occurred queue when the notice of the print processing is about the print of the print job (the job ID=1) being abnormally finished. Then, the job managing portion 13 informs a user by displaying on the display portion 14 that the print of the print job (the job ID=1) is abnormally finished.

In such a manner, the job managing portion 13 executes a processing of sequentially storing print job transmitted from the operation terminal 30 in each queue. As the procedure shown in FIG. 5, a processing procedure in which the job managing portion 13 stores one print job in each queue is explained, however, a processing of storing a print job in each queue is executed in parallel. For example, the job managing portion 13 executes, in parallel with a processing of moving the print job (the job ID=1) to the transfer completed queue, a processing of moving the print job (the job ID=2) stored in the hold queue after the print job (the job ID=1) to the being transferred queue. That is, four groups of processing of step 101 to step 102, step 103 to step 105, step 106 to step 108 and step 109 to step 113 are executed in parallel with each other, and a processing is executed depending on each print job transmitted from the operation terminal 30.

<Determination Procedure of Print Processing>

Figure 6:
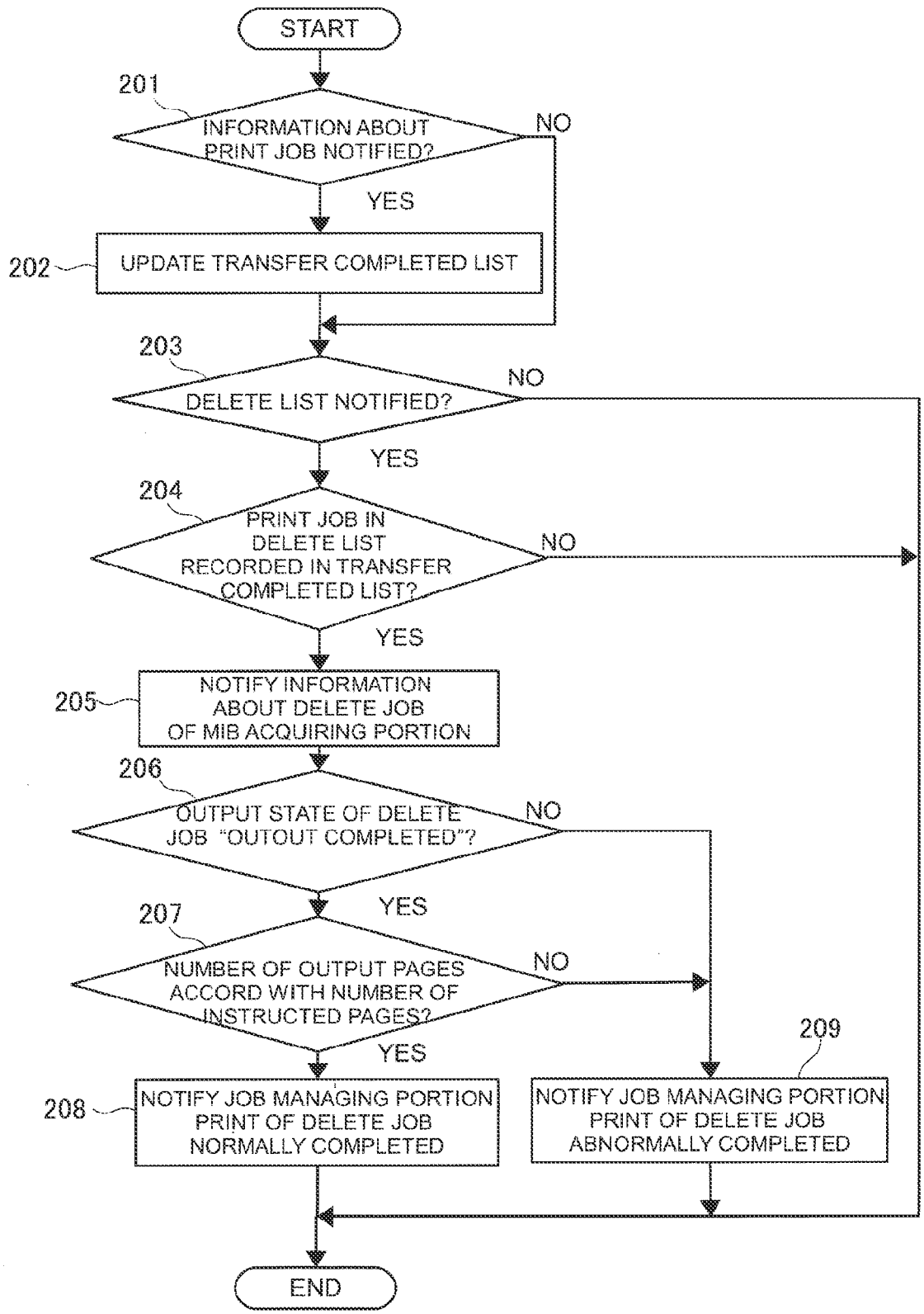
FIG. 6 is a flowchart showing a specific example of a procedure in which an output control portion determines whether print has been normally completed in a printing device or not.

Next, a processing in which the output control portion 17 determines whether print is normally completed in the printing device 20 or not will be explained. FIG. 6 is a flowchart showing a specific example of a procedure in which the output control portion 17 determines whether print has been normally completed in the printing device 20 or not. The procedure shown in FIG. 6 is, for example, repeatedly executed until a completion notice is detected by power-off of the printing control apparatus 10 or the like.

Firstly, the output control portion 17 determines whether information about a print job moved to the transfer completed queue is notified by the job managing portion 13 or not (step 201). Here, the notified information includes such as a job ID, a document name, an instructed page number like the transfer completed list shown in FIG. 4A. When the information about the print job is notified (Yes in step 201), the output control portion 17 updates the transfer completed list on the basis of the notified information (step 202).

After the transfer completed list is updated in step 202 or when the information about the print job is not notified (No in step 201), the output control portion 17 determines whether the delete list is notified by the job information acquiring portion 16 or not (step 203). If the delete list is not notified (No in step 203), the present processing flow finishes. On the other hand, if the delete list is notified (Yes in step 203), the output control portion 17 compares the transfer completed list with the delete list, and determines whether print jobs in the delete list are recorded in the transfer completed list as well or not (step 204). If any print jobs in the delete list are not recorded in the transfer completed list (No in step 204), the present processing flow finishes.

On the other hand, if print jobs in the delete list are recorded in the transfer completed list as well (Yes in step 204), the output control portion 17 notifies the MIB acquiring portion 18 of information about the print job identified as being recorded in the transfer completed list out of the print jobs in the delete list, that is, the delete job (step 205). Next, the output control portion 17 confirms the output state of the delete job on the basis of the output completed list based on the MIB information acquired by the MIB acquiring portion 18, and determines whether the output state of the delete job is "the output completed" or not (step 206).

If the output state of the delete job is "output completed" (Yes in step 206), the output control portion 17 determines whether the number of the output pages of the delete job accords with the instructed number of pages of the delete job or not (step 207). If the output page number thereof accords with the instructed page number thereof (Yes in step 207), the output control portion 17 determines that print of the delete job in the printing device 20 has been normally completed and notifies the job managing portion 13 of the determination result (step 208), and the present processing flow finishes.

On the other hand, if the output state of the delete job is not "output completed" (No in step 206) or if the output page number does not accord with the instructed page number (No in step 207), the output control portion 17 detects that an error occurs in the delete job, and determines that the print of the delete job is not normally completed and is abnormally finished. Then, the output control portion 17 notifies the job managing portion 13 of the abnormal finish (step 209), and the present processing flow finishes.

In such a manner, the output control portion 17 determines whether the print job in the delete list is the print job transferred from the printing control apparatus 10 or not, and detects an error of a print processing.

In the procedure shown in FIG. 6, in step 204 to step 209, the output control portion 17 collectively executes the processing on print jobs in the delete list, however, it is not limited thereto. For example, the output control portion 17 may select one print job from the delete list and may execute the processing of step 204 to step 209 on the selected print job and may sequentially execute the processing on each print job.

<Notification Procedure of Delete Job>

Figure 7:
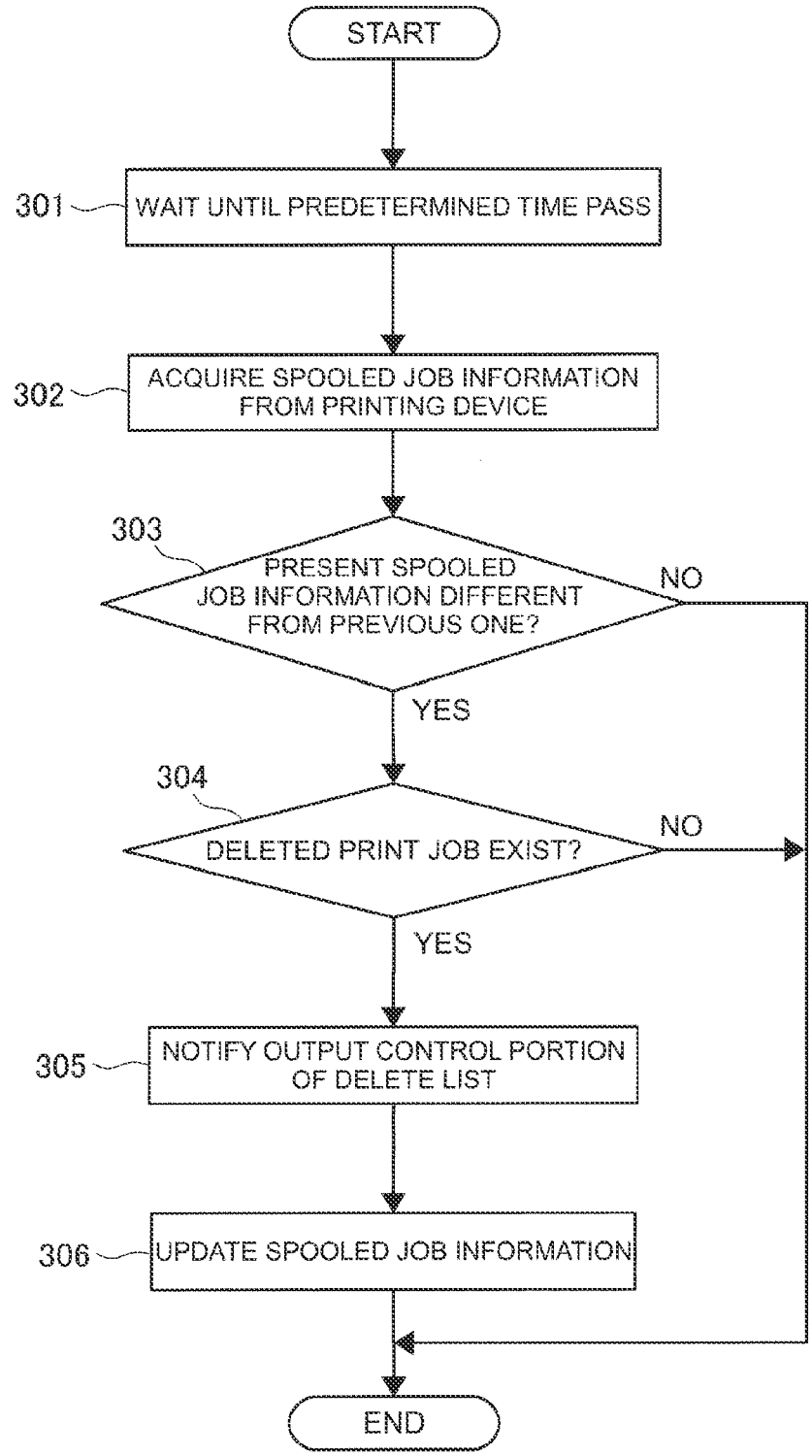
FIG. 7 is a flowchart showing a specific example of a procedure in which a job information acquiring portion gives notice of a print job which is deleted in the printing device.

Next, a processing in which the job information acquiring portion 16 gives notice of a print job deleted in the printing device 20 based on the spooled job information will be explained. FIG. 7 is a flowchart showing a specific example of a procedure in which the job information acquiring portion 16 gives notice of a print job which is deleted in the printing device 20. As an initialization state, the job information acquiring portion 16 is assumed to generate a timer which gives notice of passage of a predetermined time after the printing control apparatus 10 starts up. The procedure shown in FIG. 7 is repeatedly executed until the finish notice is detected as well as the procedure shown in FIG. 6.

Firstly, the job information acquiring portion 16 waits until the predetermined time is passed on the timer (step 301). When the predetermined time has passed, the job information acquiring portion 16 acquires the spooled job information of the printing device 20 from the printing device 20 (step 302). Next, the job information acquiring portion 16 compares the spooled job information presently acquired with the spooled job information previously acquired, and determines whether the present spooled job information is different from the previous spooled job information or not (step 303).

In the case where the present spooled job information is different from the previous spooled job information (Yes in step 303), the job information acquiring portion 16 determines whether a print job which is deleted, that is, a print job which exists in the spooled job information previously acquired however does not exist in the spooled job information presently acquired, exists or not (step 304). In the case where a print job which is deleted exists (Yes in step 304), the job information acquiring portion 16 forms a delete list in which information about the print job which is deleted is recorded, and notifies the output control portion 17 of the delete list (step 305). The job information acquiring portion 16 updates the spooled job information from the spooled job information previously acquired to the spooled job information acquired in step 302 and stores the updated spooled job information (step 306), and the present processing flow finishes.

On the other hand, if the present spooled job information is the same as the previous spooled job information (No in step 303) or if any print jobs are not deleted in step 304 (No in step 304), the present processing flow finishes.

Since the procedure in FIG. 7 is repeatedly executed after the present processing flow finishes until the finish notice is detected, the job information acquiring portion 16 periodically acquires spooled job information from the printing device 20 per the predetermined time based on the timer.

In such a manner, the job information acquiring portion 16 gives notice of the delete list on the basis of the spooled job information.

In step 303, in the case where the job information acquiring portion 16 acquires spooled job information from the printing device 20 for the first time, since the job information acquiring portion 16 is not able to determine whether a print job which is deleted exists or not as the spooled job information previously acquired does not exist, the present processing flow finishes.

As explained above, the printing control apparatus 10 in the present exemplary embodiment transfers a print job transmitted from the operation terminal 30 to the printing device 20, and acquires a processing state of the transferred print job from the printing device 20 as the spooled job information. Then, the printing control apparatus 10 identifies a print job deleted in the printing device 20 on the basis of the spooled job information, and determines whether the print job which is deleted is a print job transferred from the own apparatus or not. If the print job transferred from the own apparatus is deleted, the printing control apparatus 10 acquires MIB information from the printing device 20 and detects an error of the print processing of the print job.

In the case of having a spool function and holding plural print jobs as in the printing device 20, there is a case where print is executed in the printing device 20 by an operation of a user to the printing device 20 at an arbitrary timing, and a case where a print job in the printing device 20 is deleted by an operation failure by a user or the like. Moreover, there is a case where a print job in the printing device 20 is deleted by a security function of the printing device 20 without an operation by a user.

Therefore, by utilizing the printing control apparatus 10, for example, an error detection of a print processing of each print job is easily executed even in the case where the printing device 20 has a spool function, compared with a configuration in which information about a print job completely transferred to the printing device 20 is not acquired. For example, even if a mass-print is executed, by utilizing the printing control apparatus 10, an error detection is executed on all of the print jobs without omission and it is easily assessed whether a print job in which print is not normally completed exists or not.

Second Exemplary Embodiment

Next, the second exemplary embodiment will be explained. The printing control apparatus 10 in the present exemplary embodiment includes the same configuration as the configuration of the printing control apparatus 10 in the first exemplary embodiment but is different in the point of executing a processing on a divided print job. The printing control apparatus 10 in the present exemplary embodiment executes a processing by dividing a print job so that the printing device 20 is not occupied in the case where the instructed number of pages of the print job is the number of mass pages which, for example, exceeds a predetermined threshold value.

When a part of a print job out of the divided print jobs becomes an output error in the printing device 20, the printing control apparatus 10 instructs the printing device 20 so that the rest of the print jobs out of the divided print jobs are deleted. Hereinafter, plural print jobs generated by dividing are referred to as division jobs. In the present exemplary embodiment, the same configurations as those in the first exemplary embodiment are appended to the same symbols and the detail explanations thereof are omitted.

The printing control apparatus 10 in the present exemplary embodiment, as well as the first exemplary embodiment, includes the receiving portion 11, the operation receiving portion 12, the job managing portion 13, the display portion 14, the job transferring portion 15, the job information acquiring portion 16, the output control portion 17, the MIB acquiring portion 18 and the first spooler 19. The job managing portion 13, the job information acquiring portion 16, and the output control portion 17 execute the same processing as the processing in the first exemplary embodiment and a processing below as well.

The job managing portion 13 divides a print job and transfers the print job to the job transferring portion 15 in the case where the instructed page number of the print job exceeds the predetermined threshold value. Here, the job managing portion 13 gives information of a job ID or a document name to the each divided print job. The job managing portion 13 gives information related to the division to the print job to be moved from the hold queue to the being transferring queue.

When the job managing portion 13 is notified that a delete job has become an output error and is a division job from the output control portion 17, the job managing portion 13 displays, on the display portion 14, a message indicating that the rest of the division jobs in the printing device 20 are to be deleted. When the operation receiving portion 12 receives an operation instructs to delete the division job, the job managing portion 13 outputs an instruction to delete the division jobs to the output control portion 17.

The job managing portion 13 moves print jobs which respectively have the same job IDs as the deleted division jobs from the transfer completed queue to the delete completed queue (not shown in a figure), when the job managing portion 13 is notified that the division jobs which are objects to be deleted are deleted by the output control portion 17.

After the output control portion 17 determines whether print of the delete jobs is normally completed or not on the basis of the output completed list acquired from the MIB acquiring portion 18, the output control portion 17 determines whether the delete jobs which have become output error for the print thereof has not been normally completed are division jobs or not. In the case where the delete jobs which have become output errors are division jobs, the output control portion 17 notifies the job managing portion 13 that the delete jobs have become output errors and the delete jobs are division jobs.

Moreover, the output control portion 17 notifies the job information acquiring portion 16 of the division jobs which are objects to be deleted when the output control portion 17 is received an instruction to delete division jobs from the job managing portion 13.

Further, the output control portion 17 notifies the job managing portion 13 that the division jobs which are objects to be deleted have been deleted if the division jobs which are objects to be deleted are included in the deleted list which is notified by the job information acquiring portion 16.

The job information acquiring portion 16 as an example of an instructing unit outputs an instruction to delete the notified division jobs to the printing device 20 when the job information acquiring portion 16 is notified the division jobs which are objects to be deleted by the output control portion 17.

<Processing in Case where Division Job has Become an Output Error>

Figure 8:
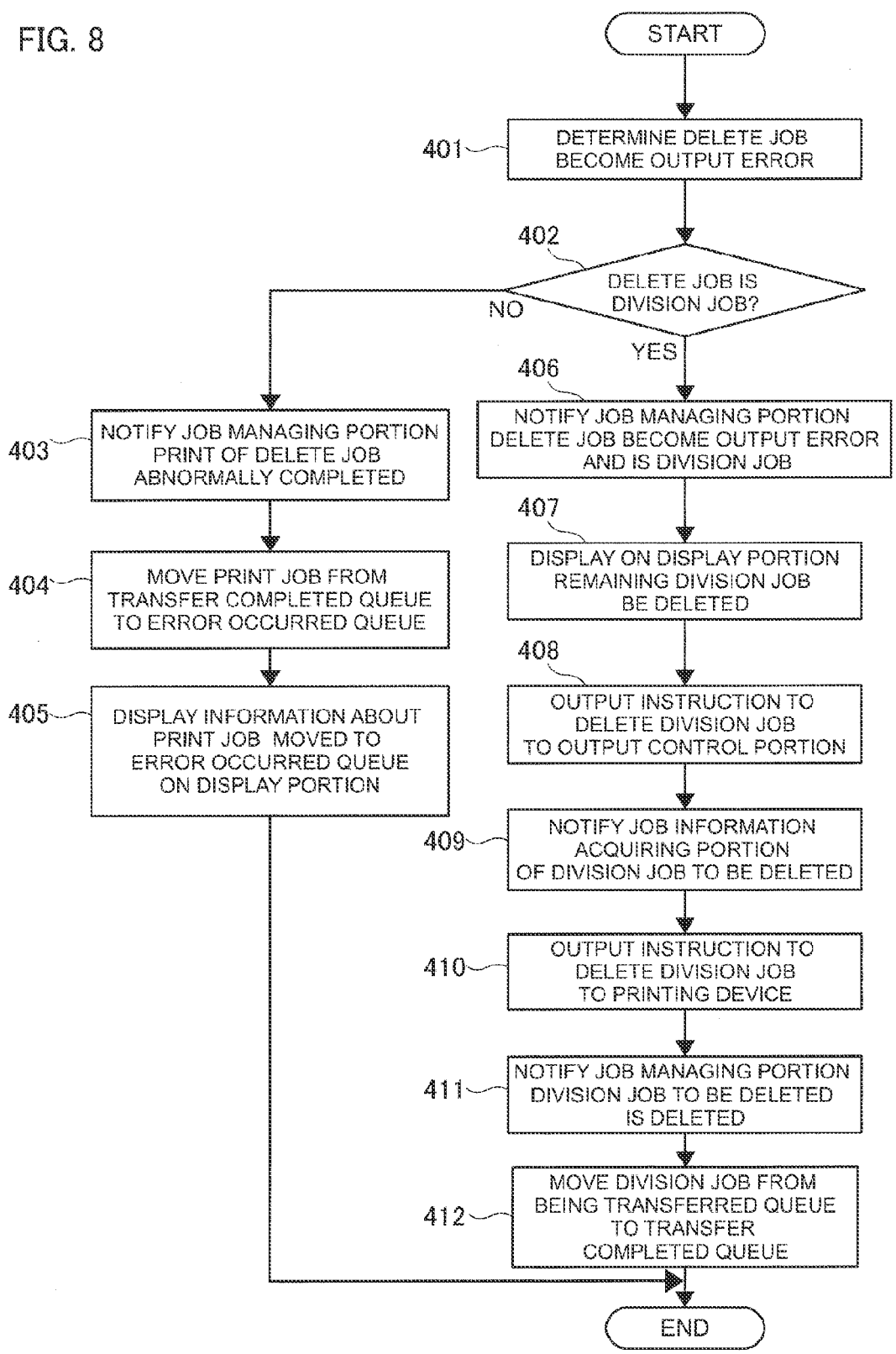
FIG. 8 is a flowchart showing a specific example of a processing procedure in the case where a division job has become an output error.

Next, a processing in the case where the division job has become an output error will be explained. FIG. 8 is a flowchart showing a specific example of a processing procedure in the case where the division job has become an output error. Here, it will be explained on the assumption that, as an initialization state, the output control portion 17 detects an error of a print processing of a delete job on the basis of the output completed list acquired from the MIB acquiring portion 18. Specifically, the determination is assumed to be negative (No) in the procedure of step 206 or step 207 shown in FIG. 6. The procedure shown in FIG. 8 is assumed to be repeatedly executed until the finish notice is detected as well as the procedures shown in FIG. 6 and FIG. 7.

Firstly, the output control portion 17 determines that the print of the delete job has not been normally completed in the printing device 20 and the delete job has become an output error (step 401). Next, the output control portion 17 determines that the delete job which is determined to be an output error is a division job or not (step 402). In the case where the delete job is not a division job (No in step 402), as in the step 209 in FIG. 6, the output control portion 17 notifies the job managing portion 13 that the print of the delete job is abnormally finished (step 403). A processing of step 404 and a processing of step 405 after that are respectively similar to the processing of the step 112 and the processing of step 113 in FIG. 5, the explanation thereof is omitted. Then, after the processing of step 405, the present processing flow finishes.

On the other hand, in the case where the delete job which has become an output error is a division job (Yes in step 402), the output control portion 17 notifies the job managing portion 13 that the delete job has become an output error and is a division job (step 406). Next, when the job managing portion 13 is notified that the delete job has become an output error and is a division job, the job managing portion 13 displays on the display portion 14 a message indicating that the division jobs remaining in the printing device 20 be deleted (step 407).

Next, when a user confirms the message displayed on the display portion 14 and operates to delete the rest of the division jobs, the job managing portion 13 outputs an instruction to delete the division job to the output control portion 17 (step 408). Then, the output control portion 17 notifies the job information acquiring portion 16 of the division jobs which is an object to be deleted, when the output control portion 17 receives an instruction to delete the division job (step 409). Here, the division job which is an object to be deleted is, before being divided, the identical print job with the division job determined to be an output error in step 401, and is the remaining division job in the printing device 20.

Next, when the job information acquiring portion 16 is notified a division job which is an object to be deleted, the job information acquiring portion 16 outputs an instruction to delete the notified division job to the printing device 20 (step 410). After that, when the output control portion 17 acquires, from the job information acquiring portion 16, a delete list including the division job which is notified as an object to be deleted in step 409, the output control portion 17 notifies the job managing portion 13 that the division job which is an object to be deleted is deleted (step 411).

When the job managing portion 13 is notified, by the output control portion 17, that the division job which is an object to be deleted is deleted, the job managing portion 13 moves a division job having the same job ID as the deleted division job from the transfer completed queue to the delete completed queue (step 412), and the present processing flow finishes. After the job managing portion 13 shifted the division job to the delete completed queue, the job managing portion 13 may display information about the print job shifted to the delete completed queue on the display portion 14 as well as step 405.

In step 407, the job managing portion 13 displays a message indicating that the division jobs still remaining in the printing device 20 be deleted; however, the job managing portion 13 may execute the processing of step 404 and the processing of step 405 on the division job which is determined to be an output error in step 401. Here, the division job determined to be an output error may be moved from the transfer completed queue to the error occurred queue, and the rest of the division jobs (that is, the division job which is an object to be deleted) may be moved from the transfer completed queue to the error occurred queue. In this case, the division job is moved from the error occurred queue to the delete completed queue in step 412.

As a message indicating that the division job be deleted, for example, provided is a message or the like asking a user to approve the division job to be deleted with a pop-up. Then, if a user approves the delete, an instruction to delete the division job is performed. Here, a message such that a user is able to select which division jobs to delete may be displayed. Further, for example, only a message indicating that a division job be deleted may be displayed on the display portion 14, and a processing of deleting the division job may be executed in the printing control apparatus 10 and the printing device 20 without any operations by user.

<Processing in Case where Division Job has Become an Output Error>

Next, an example of a processing in the case where a division job becomes an output error will be explained. FIG. 9A to FIG. 9C are diagrams showing specific examples of each list when the division job has become an output error. FIG. 9A is a diagram showing a specific example of a transfer completed list. FIG. 9B is a diagram showing a specific example of a delete list. FIG. 9C is a diagram showing a specific example of an output completed list. It will be explained on the assumption that the print job (the job name=the job 2) is a division job and a part thereof is deleted in the printing device 20 before a print processing is executed in specific examples of FIG. 9A to FIG. 9C.

Firstly, information about five print jobs is recorded in the transfer completed list shown in FIG. 9A. Here, the print job (the job name=the job 2) is divided into two print jobs, and the transfer completed list includes two print jobs (division jobs) of the print jobs before being divided and after being divided. That is, the transfer completed list includes a print job in which an instructed page number thereof is 100 and two division jobs (the job ID=2, 3) in which an instructed page number thereof is respectively 50. The other two print jobs (the job ID=1, 4) are print jobs transferred to the printing device 20 without being divided.

Next, information about one division job is recorded in the delete list shown in FIG. 9B. The delete list shown in FIG. 9B indicates that a print job in which a document name thereof is "document 2-1" is deleted in the printing device 20. In the specific examples shown in FIGS. 9A to 9C, the print job (the document name=document 2-1) is identified as a delete job which is recorded in the transfer completed list and the delete list.

Next, information about one print job is recorded in the output completed list shown in FIG. 9C. The output completed list shown in FIG. 9C indicates information about the delete job (the job ID=2) which is identified by the output control portion 17. Additionally, the output completed list shown in FIG. 9C is MIB information acquired from the printing device 20 on the basis of the job ID (=2) of the delete job of which the MIB acquiring portion 18 is notified by the output control portion 17.

The output control portion 17 determines whether the print of the delete job has been normally completed or not on the basis of the output completed list. In a specific example shown in FIG. 9C, since "the output state" of the print job (the job ID=2) is "output uncompleted", the print job (the job ID=2) is not printed and is deleted in the printing device 20, and the output control portion 17 determines that the print job (the job ID=2) is a print job which has become an output error. The output control portion 17 determines whether the print job (the job ID=2) which has become an output error is a division job or not based on a document name of the transfer completed list or the like.

Here, the determination whether the print job is the division job or not is executed, for example, on the basis of a document name of the division job. When the job managing portion 13 names the document name of the division job, for example, the job managing portion 13 gives a number to each divided print job in order, and regards what the given number and the individual name of the printing control apparatus 10 are combined as a document name. The output control portion 17 comes to be able to determine whether the print job is the division job or not on the basis of the document name by defining a naming rule of the document name in such a manner. In a specific example shown in FIG. 9A, the document names (document 2-1, document 2-2) of the division jobs (the job ID=2, 3) are named by combining "the document 2" which is a unique name of the printing control apparatus 10 with the numbers (1 or 2).

Moreover, the output control portion 17 may execute a determination of a division job on the basis of a job name and a job ID. In a specific example shown in FIG. 9A, the job managing portion 13 regards the job name of the division job as the same job name of the print job before being divided, and gives the respective division job a different job ID from each. Therefore the output control portion 17 is able to determine that a print job having the same job name as the print job and having different job ID from each other is a division job out of plural print jobs. Further, the determination procedure of the division job is not limited thereto as above-described, and the job managing portion 13 may apply a flag representing being divided to the division job.

When the output control portion 17 determines that the print job (the job ID=2) is a division job, the print job (the job ID=2) has become an output error, and the output control portion 17 notifies the job managing portion 13 that the print job (the job ID=2) is a division job. Next, the job managing portion 13 displays on the display portion 14 a message indicating that the rest of the division jobs in the printing device 20 be deleted.

When a user operates to delete the rest of the division job, the output control portion 17 notifies the job information acquiring portion 16 of the division job which is an object to be deleted. Here, the output control portion 17 determines the division job which is an object to be deleted, for example, on the basis of such as a document name, a job name, and a job ID, and notifies the job information acquiring portion 16 determining. The division job which is an object to be deleted in the specific example shown in FIG. 9 is a division job (the job ID=3). When the job information acquiring portion 16 is notified of the division job which is an object to be deleted, the job information acquiring portion 16 outputs an instruction to delete the division job (the job ID=3) to the printing device 20. When the print job (the job ID=3) is deleted, the job managing portion 13 moves the print job (the job ID=3) in the transfer completed queue to the delete completed queue.

As explained above, the printing control apparatus 10 in the present exemplary embodiment divides a print job and determines whether a print job which has become an output error is a division job or not. Then, in the case where the print job which has become an output error is the division job, the printing control apparatus 10 displays a message indicating that the rest of the division jobs in the printing device 20 be deleted and instructs the printing device 20 to delete the division job which is an object to be deleted. In such a manner, out of print jobs which the printing device 20 holds, print jobs which have become unnecessary would be deleted.

In the first exemplary embodiment and the second exemplary embodiment, the job information acquiring portion 16 periodically acquires spooled job information from the printing device 20; however, it is not limited thereto. For example, the printing device 20 notifies the printing control apparatus 10 in the case where the state of the printing device 20 is changed, and the job information acquiring potion 16 may acquires the spooled job information from the printing device 20 based on the notice.

Further, in the first exemplary embodiment and the second exemplary embodiment, the job managing portion 13 stores a print job; however, the job managing portion 13 may not store all of the print jobs and, for example, may store a part of data of the print job, such as an item of the transfer completed list.

Moreover, in the first exemplary embodiment and the second exemplary embodiment, the output control portion 17 determines whether a print processing of a print job has been normally completed or not by comparing the instructed page number thereof with the output page number thereof; however, it is not limited thereto. The output control portion 17 may use any information as far as the output control portion 17 can determine whether the print has been normally completed or not.

In the first exemplary embodiment and the second exemplary embodiment, information to be notified to a user is displayed on the display portion 14 of the printing control apparatus 10; however, it is not limited thereto. For example, information for notice may be transmitted from the printing control apparatus 10 to the operation terminal 30 and may be displayed on a display screen which the operation terminal 30 includes.

In the first exemplary embodiment and the second exemplary embodiment, the printing control system 1 includes one printing device 20 and one operation terminal 30; however, the printing control system 1 may include plural printing devices 20 or plural operation terminals 30. In the case where the printing control system 1 includes plural printing devices 20, the operation terminal 30 transmits a print job to the printing control apparatus 10 designating a printing device 20 to be a transmitting address of the print job. Each queue in the job managing portion 13 exists per a printing device 20, and the transfer completed list is generated per a printing device 20.

<Hardware Configuration Example of Printing Control Apparatus>

Figure 10:
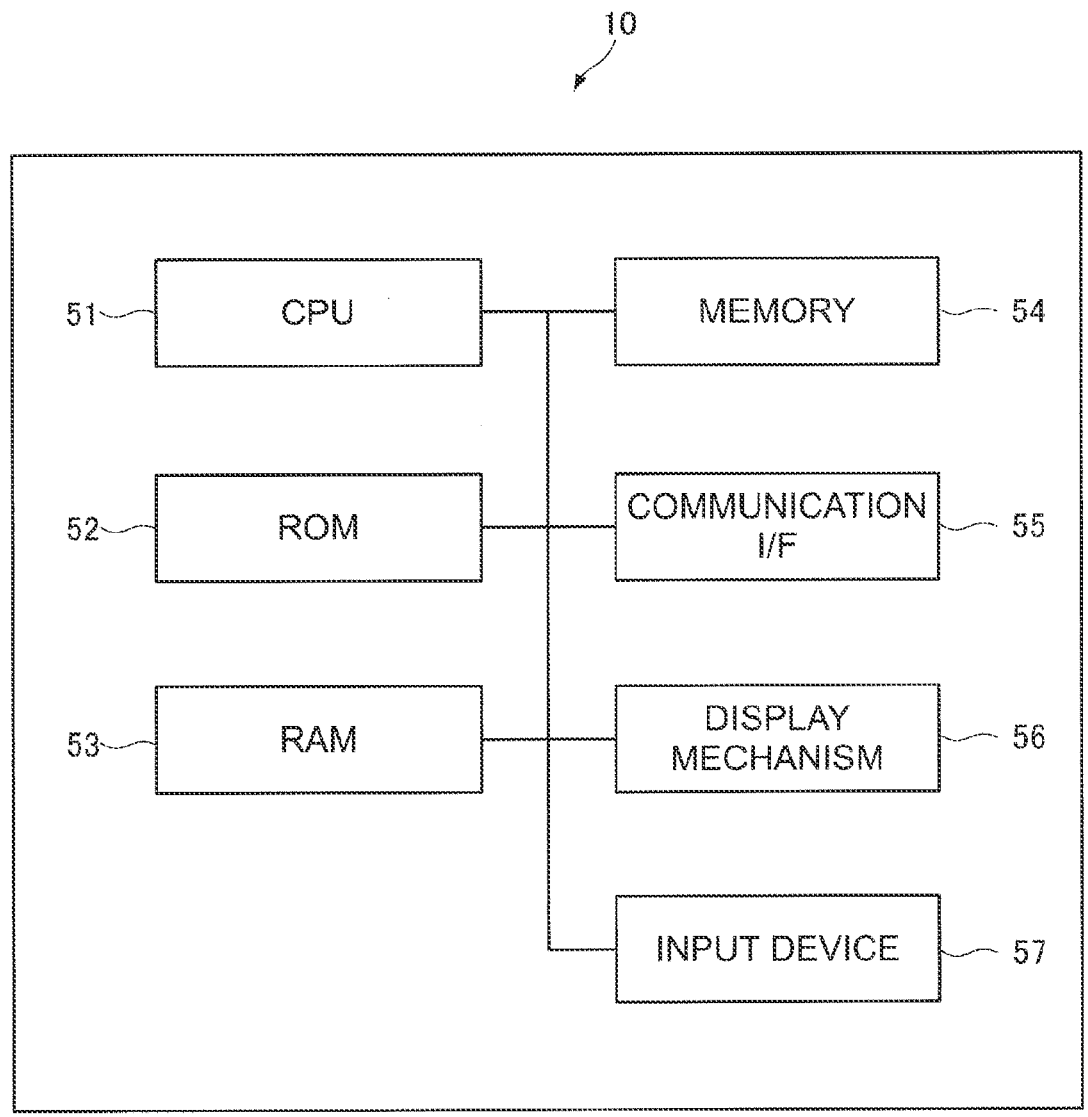
FIG. 10 is a diagram showing a hardware configuration example of the printing control apparatus in the present exemplary embodiment.

Next, a hardware configuration of the printing control apparatus 10 in the first exemplary embodiment and the second exemplary embodiment will be explained. FIG. 10 is a diagram showing a hardware configuration example of the printing control apparatus 10 in the present exemplary embodiment. As shown in the figure, the printing control apparatus 10, for example, is realized by a configuration of a general-purpose computer, and includes a Central Processing Unit (CPU) 51 as an arithmetic unit, a Read Only Memory (ROM) 52 as a memory unit, a Random Access Memory (RAM) 53, and a memory 54.

The ROM 52 stores, therein, the various programs, and the RAM 53 is used as a working memory at the time in which the various programs are executed by the CPU 51. The memory 54 is, for example, a memory area for storing, therein, such as input data and output data in the various programs. The ROM 52 is stored, therein, a program for implementing each function of the printing control apparatus 10 in the present exemplary embodiment. The program is loaded by the RAM 53 and a processing based on the program is executed by the CPU 51, therefore, each function of the printing control apparatus 10 is achieved. The printing control apparatus 10 includes a communication I/F 55 which is for communicating with outside portions, a display mechanism 56 which is a display device such as a liquid crystal display, an organic Electroluminescence (EL) display, and an input device 57 such as a keyboard and a mouse.

Specifically, in the printing control apparatus 10, with the instructions of the CPU 51, the functions of the receiving portion 11, the operation receiving portion 12, the job managing portion 13, the display portion 14, the job transferring portion 15, the job information acquiring portion 16, the output control portion 17, and the MIB acquiring portion 18 are achieved. Such as a receive of a print job by the receiving portion 11, an acquisition of spooled job information by the job information acquiring portion 16, and an acquisition of MIB information by the MIB acquiring portion 18 are executed, for example, through the communication I/F 55. Moreover, for example, the queues which the job managing portion 13 has are achieved by the memory 54. Further, for example, the display portion 14 is achieved by the display mechanism 56.

<Explanation of Program>

A processing executed by the printing control apparatus 10 in the present exemplary embodiment in the above explanation is, for example, prepared as a program such as application software as described-above.

Therefore, a processing executed by the printing control apparatus 10 can be captured as a program for realizing, on a computer, a function of receiving a print instruction to instruct to print on a recording medium; a function of storing a received print instruction in a storing portion and transferring the received print instruction to a printing device including a region in which is able to be store plural print instructions; a function of acquiring information related to a processing state of a print instruction which is deleted in the printing device in the case where a print instruction is deleted in the printing device and the print instruction which is deleted is a print instruction transferred by the function of transferring, and a function of detecting an error of a print processing of the print instruction which is deleted on the basis of the acquired information related to the processing state.

The program that achieves the present exemplary embodiment may be provided not only by a communication unit but also by being stored in a recording medium such as a CD-ROM.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment as chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing control apparatus comprising:
   a processor configured to execute:
      a receiving unit, wherein the receiving unit receives a print instruction to instruct to print on a recording medium;
      a transferring unit that makes a storing portion store the print instruction received by the receiving unit and transfer the print instruction to a printing device including a region in which a plurality of print instructions are able to be stored;
      an acquiring unit that acquires, in the case where a print instruction is deleted in the printing device, if the deleted print instruction is the print instruction transferred by the transferring unit, information related to a processing state of the deleted print instruction in the printing device;
      a detecting unit that detects an error of a printing processing in the deleted print instruction based on the information related to the processing state acquired by the acquiring unit; and
      an instructing unit that instructs the printing device to delete a print instruction,
   wherein the transferring unit, in the case where the number of pages instructed to output by a print instruction exceeds a predetermined threshold value, divides the print instruction and transfers the print instruction to the printing device, and
   wherein the instructing unit, in the case where the error is detected by the detecting unit in the printing processing of one print instruction out of a plurality of divided print instructions, instructs the printing device to delete the rest of the print instruction out of the plurality of divided print instructions.

2. The printing control apparatus according to claim 1 wherein the processor is further configured to execute:
   an information acquiring unit that acquires information representing a print instruction held by the printing device; and
   an identifying unit that identifies the print instruction deleted in the printing device based on a first information which is information about a print instruction acquired by the information acquiring unit and a second information which is information about a print instruction acquired by the information acquiring unit prior to acquisition of the first information.

3. The printing control apparatus according to claim 2, wherein the acquiring unit acquires, in the case where the print instruction identified by the identifying unit includes unique information given to the print instruction stored in the storing unit, the information related to the processing state in the printing device assuming that the identified print instruction is the print instruction transferred by the transferring unit.

4. The printing control apparatus according to claim 1, wherein the detecting unit detects the error of the printing processing in the case where a print instruction is not assumed to be outputted in the information related to the processing state or in the case where the number of pages having been completely outputted which is included in the information related to the processing state and the number of pages instructed to output by the print instruction stored in the storing unit are different from each other.

5. A printing control apparatus comprising:
   a processor configured to execute:
      a receiving unit, wherein the receiving unit receives a print instruction to instruct to print on a recording medium;
      a transferring unit that makes a storing portion store the print instruction received by the receiving unit and transfer the print instruction to a printing device including a region in which a plurality of print instructions are able to be stored;
      an acquiring unit that acquires, in the case where a print instruction is deleted in the printing device, if the deleted print instruction is the print instruction transferred by the transferring unit, information related to a processing state of the deleted print instruction in the printing device;
      a detecting unit that detects an error of a printing processing in the deleted print instruction based on the information related to the processing state acquired by the acquiring unit; and
   a movement control unit that performs a control of moving a print instruction in which an error is not detected by the detecting unit in the printing processing from a first region to a second region in the storing portion and performs a control of moving a print instruction in which an error is detected by the detecting unit in the printing processing from the first region to a third region in the storing portion.

6. A printing control system comprising:
   a printing device configured to perform a printing processing based on a print instruction to instruct to print on a recording medium; and
   a printing control apparatus that is connected with the printing device via a communication line,
   wherein the printing device includes a region in which a plurality of print instructions transmitted from the printing control apparatus are able to be stored,
   wherein the printing control apparatus includes:
      a processor configured to execute:
         a receiving unit, wherein the receiving unit receives the print instruction;
         a transferring unit that makes a storing portion store the print instruction received by the receiving unit and transfer the print instruction to the printing device;
         an acquiring unit that acquires, in the case where a print instruction is deleted in the printing device, if the deleted print instruction is a print instruction transferred by the transferring unit, information related to a processing state of the deleted print instruction in the printing device;
         a detecting unit that detects an error of a printing processing in the deleted print instruction based on the information related to the processing state acquired by the acquiring unit; and an instructing unit that instructs the printing device to delete a print instruction, wherein the transferring unit, in the case where the number of pages instructed to output by a print instruction exceeds a predetermined threshold value, divides the print instruction and transfers the print instruction to the printing device, and wherein the instructing unit, in the case where the error is detected by the detecting unit in the printing processing of one print instruction out of a plurality of divided print instructions, instructs the printing device to delete the rest of the print instruction out of the plurality of divided print instructions.

7. A non-transitory computer readable medium storing a program causing a computer to execute a process for controlling a printing control apparatus, the processing comprising:

receiving a print instruction to instruct to print on a recording medium;

making a storing portion store the received print instruction and transferring the print instruction to a printing device including a region in which a plurality of print instructions are able to be stored;

acquiring, in the case where a print instruction is deleted in the printing device, if the deleted print instruction is the transferred print instruction, information related to a processing state of the deleted print instruction in the printing device;

detecting an error of a print processing in the deleted print instruction based on the information related to the acquired processing state;

instructing the printing device to delete a print instruction;

in the case where the number of pages instructed to output by a print instruction exceeds a predetermined threshold value, dividing the print instruction and transferring the print instruction to the printing device; and in the case where the error is detected in the printing processing of one print instruction out of a plurality of divided print instructions, instructing the printing device to delete the rest of the print instruction out of the plurality of divided print instructions.

* * * * *